US008570438B2

(12) United States Patent
Bhaskaran et al.

(10) Patent No.: US 8,570,438 B2
(45) Date of Patent: Oct. 29, 2013

(54) AUTOMATIC ADJUSTMENTS FOR VIDEO POST-PROCESSOR BASED ON ESTIMATED QUALITY OF INTERNET VIDEO CONTENT

(75) Inventors: Vasudev Bhaskaran, Sunnyvale, CA (US); Mainak Biswas, Santa Cruz, CA (US); Nikhil Balram, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 651 days.

(21) Appl. No.: 12/764,214

(22) Filed: Apr. 21, 2010

(65) Prior Publication Data
US 2010/0265334 A1    Oct. 21, 2010

Related U.S. Application Data

(60) Provisional application No. 61/171,234, filed on Apr. 21, 2009.

(51) Int. Cl.
*H04N 5/46* (2006.01)

(52) U.S. Cl.
USPC .......................................... 348/555; 348/554

(58) Field of Classification Search
USPC ......... 348/180, 181, 191, 192, 554–558, 581, 348/582, 441–459; 702/81, 84; 725/135
See application file for complete search history.

(56) References Cited

U.S. PATENT DOCUMENTS

| 7,199,819 | B2 * | 4/2007 | Sugimoto et al. ............ 348/192 |
| 7,724,310 | B2 * | 5/2010 | Higashi ........................ 348/725 |
| 7,821,534 | B2 * | 10/2010 | Somers ........................ 348/181 |
| 8,154,602 | B2 * | 4/2012 | Yamagishi et al. ........... 348/192 |
| 2002/0067369 | A1 | 6/2002 | Sullivan |
| 2003/0001964 | A1 | 1/2003 | Masukura et al. |
| 2004/0012675 | A1 * | 1/2004 | Caviedes ...................... 348/180 |
| 2004/0170330 | A1 | 9/2004 | Fogg |
| 2007/0234385 | A1 | 10/2007 | Bopardikar |
| 2008/0143877 | A1 * | 6/2008 | Urabe et al. .................. 348/556 |

FOREIGN PATENT DOCUMENTS

| WO | WO 03/005729 | 1/2003 |
| WO | WO 03/077562 | 9/2003 |
| WO | WO 08/007304 | 1/2008 |

OTHER PUBLICATIONS

International Search Report for Application No. PCT/US2010/031911 (corresponding hereto) mailed Feb. 7, 2010 ; 4 pages.

* cited by examiner

*Primary Examiner* — Michael Lee

(57) ABSTRACT

A system including a quality estimation module configured to estimate a visual quality of video content based on data from a decoder module. The system further including a settings database configured to store a plurality of predetermined settings. The settings database outputs at least one of the predetermined settings in response to the visual quality. The system further including a video post-processor module configured to automatically adjust settings of the video post-processor module based on the at least one of the predetermined settings. The video content is processed based on the settings of the video post-processor module that were automatically adjusted.

14 Claims, 7 Drawing Sheets

AUTOMATIC ADJUSTMENTS FOR VIDEO POST-PROCESSOR BASED ON ESTIMATED QUALITY OF INTERNET VIDEO CONTENT

CROSS-REFERENCE TO RELATED APPLICATIONS

This application claims the benefit of U.S. Provisional Application No. 61/171,234, filed on Apr. 21, 2009. The disclosure of the above application is incorporated herein by reference in its entirety.

FIELD

The present disclosure relates to Internet video content and more particularly to quality of Internet video content.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Digital video content that is available on DVDs and in a broadcast environment is restricted to relatively few video resolutions. These video resolutions are typically "standard definition" or "high definition".

In contrast, video content that is streamed over the Internet spans a wide range of resolutions from low definition Quarter Video Graphics Array (QVGA) (e.g., 320×240 pixel resolution) to high definition (e.g., 720 lines of progressive video (720p)). Further, Internet video content is compressed using one of a variety of standard codecs or proprietary codecs and covers a wide range of bitrates, e.g., from 200 kbps to greater than 5 Mbps.

Wide variations in resolutions, codec artifacts and bitrates lead to a wide range of video quality for the streamed video content. Further, network bandwidth is often limited. Therefore, video content is often scaled to the available bandwidth. This scaling may affect video quality. Most streaming video content is therefore of much lower quality than typical broadcast TV services.

Many receivers, e.g., an Internet Protocol TV (IPTV) set top box, include a video post-processing function to improve quality of video content.

SUMMARY

A system comprising a quality estimation module configured to estimate a visual quality of video content based on data from a decoder module. The system further comprising a settings database configured to store a plurality of predetermined settings. The settings database outputs at least one of the predetermined settings in response to the visual quality. The system further comprising a video post-processor module configured to automatically adjust settings of the video post-processor module based on the at least one of the predetermined settings. The video content is processed based on the settings of the video post-processor module that were automatically adjusted.

In other features, the quality estimation module determines a quality factor to represent the visual quality of the video content. The data includes metadata information that indicates transmission features for the video content. The system further comprising a database control module to select the at least one of the predetermined settings based on the quality factor. The database control module comprises an estimation module to adjust selection of the at least one of the predetermined settings based on video outputs of the video post-processor module.

In other features, the system further comprises an estimation module to estimate residual artifacts in output signals from the post-processor module. The output signals include the video content after sub-module settings for sub-modules of the video post-processor module have been adjusted a first time. The selection module re-selects from at least one of the predetermined settings based on estimates of the residual artifacts to adjust the sub-module settings a second time.

In still other features, the systems and methods described above are implemented by a computer program executed by one or more processors, by computer hardware, or a combination of HW and SW. The computer program can reside on a computer readable medium such as but not limited to memory, nonvolatile data storage, and/or other suitable tangible, non-transitory storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
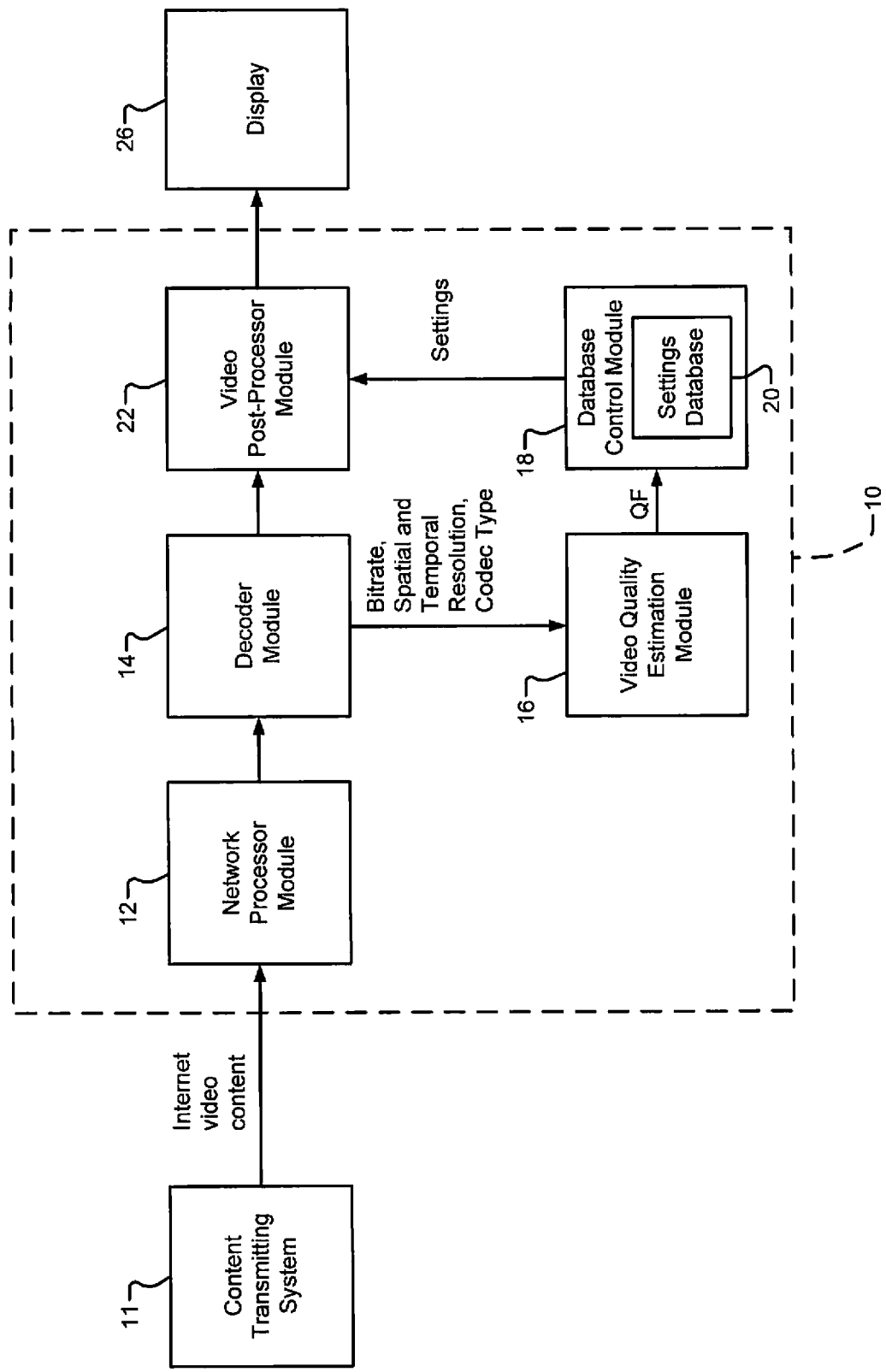
FIG. 1 is a block diagram that illustrates a video processing system according to a first embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group)

and/or memory (shared, dedicated, or group) that execute one or more software or firmware programs, a combinational logic circuit, and/or other suitable components that provide the described functionality.

Referring now to FIG. 1, a video processing system 10 is illustrated. A content transmitting system 11 that is external to the system 10 provides input, such as Internet video signals including Internet video content, to a network processor module 12 of the system 10. In one embodiment, the content transmitting system 11 is an Internet Protocol television (IPTV) transmitter, an Internet television (ITV) transmitter, and/or a streaming TV transmitter.

A decoder module 14 receives and decodes the video signals from the network processor module 12. An example of the decoder module 14 is a multi-format video decoder that decodes data from different types of encoders.

A video quality estimation module 16 receives data from the decoder module 14. An example of the data is coded stream metadata that describes how the content was transmitted, i.e., transmission features for the data. Examples of the metadata are bitrate, spatial resolution, temporal resolution and codec type. The video quality estimation module 16 estimates a quality factor based on some or all of the data from the decoder module 14. The quality factor provides an estimation of a visual quality of the video content. The visual quality corresponds to an agreed-upon standard quality for a displayed video image.

In one embodiment, the quality factor suggests an amount of adjustment to improve the quality of the video content at or close to a predetermined level. In another embodiment, the quality factor indicates the amount of compression the video content has undergone.

A database control module 18 receives the quality factor and selects one of a plurality of settings from a database 20. The database settings are predetermined and correspond to settings for a video post-processor module 22.

The video post-processor module 22 receives the database settings from the database 20 and adjusts post-processing settings based on the database settings. In one embodiment, adjustments of post-processing settings include turning on or off settings of the video post-processor module 22. In another embodiment, adjustments of post-processing settings include increasing or decreasing settings of the video post-processor module 22 to predetermined levels.

In one embodiment, the predetermined levels are determined through experimentation by computing quality factors for content coded at different bitrates. For content coded at different bitrates, the settings for each of the modules of the video postprocessor module 22 are adjusted to yield a visually pleasing result on a display 26. The display 26 receives and displays the video content based on the post-processor settings. Further adjustments and display analysis (for visually pleasing results) are repeated for a variety of content and visual evaluations to yield the predetermined levels for the video post-processor module 22.

In one embodiment, adjustments of post-processing settings include increasing or decreasing settings of the post-processor module 22 by predetermined amounts. The database control module 18 adjusts the post-processor settings to either remove or reduce artifacts that affect the video content.

Examples of artifacts are blockiness, ringing, false edges, blurring and loss of colorfulness. Blockyness is distortion that is due to aggressive quantization of the transform data. Ringing is distortion that is present at high contrast edges close to smooth areas. False edges are distortion that is due to motion compensation of a blocking artifact. Blurring is distortion that is due to loss of high frequency components of the signal represented by the underlying coded block unit. Loss of colorfulness is due to aggressive quantization and reduction of dynamic range of the chroma components relative to the luma. Therefore, examples of post-processor settings are settings for blockyness, ringing, mosquito noise, false edges, blurring and loss of colorfulness.

In one embodiment, the content transmitting system 11 selectively includes the metadata of the video content on a stream session basis for sessions that have a consistent bitrate throughout an entire video stream. For this embodiment, the post-processor module 22 adapts settings on a stream session basis based on the quality factor.

In another embodiment, the content transmitting system 11 selectively includes the metadata of the video content on a group of pictures (GOP) basis. The group of pictures basis is used when streaming sites change the bitrate and spatial resolution according to the bandwidth available at any given time. For this embodiment, the post-processor module 22 adapts settings on a group of pictures basis based on the quality factor.

In another embodiment, the content transmitting system 11 includes the metadata on a frame by frame basis. For this embodiment, the post-processor module 22 adapts settings on a frame by frame basis based on the quality factor.

The video quality estimation module 16 determines a quality factor for each session, group of pictures or frame based on the metadata information and/or the video content.

In one embodiment, the video quality estimation module 16 estimates the quality factor (QF) as follows:

$$QF = \frac{\text{Bitrate (kbps)} \times \text{codec\_weight}}{\text{Spatial Resolution} \times \text{Temporal Resolution } (fps)}.$$

Spatial Resolution corresponds to frame width multiplied by frame height in, for example, pixels. Codec weight corresponds to a weight factor that captures quality improvement using one codec relative to another. Codec weight is expressed relative to a preselected standard that has a codec weight of 1, so that quality factor is greater than 0.

In one embodiment, different codec weights are assigned to different coding methods based on the bitrate. For example, a first coding method has a codec weight of 1 for bitrates less than or greater than 1 Mbps. A second coding method has a codec weight of 1.33 for bitrates less than or greater than 1 Mbps. A third coding method has a codec weight of 1.74 for bitrates less than 1 Mbps and a codec weight of 2.75 for bitrates greater than 1 Mbps. A fourth coding method has a codec weight of 2 for bitrates less than 1 Mbps and a codec weight of 3.16 for bitrates greater than 1 Mbps. For each coding method, using the same content, the bitrate is different.

Figure 2:
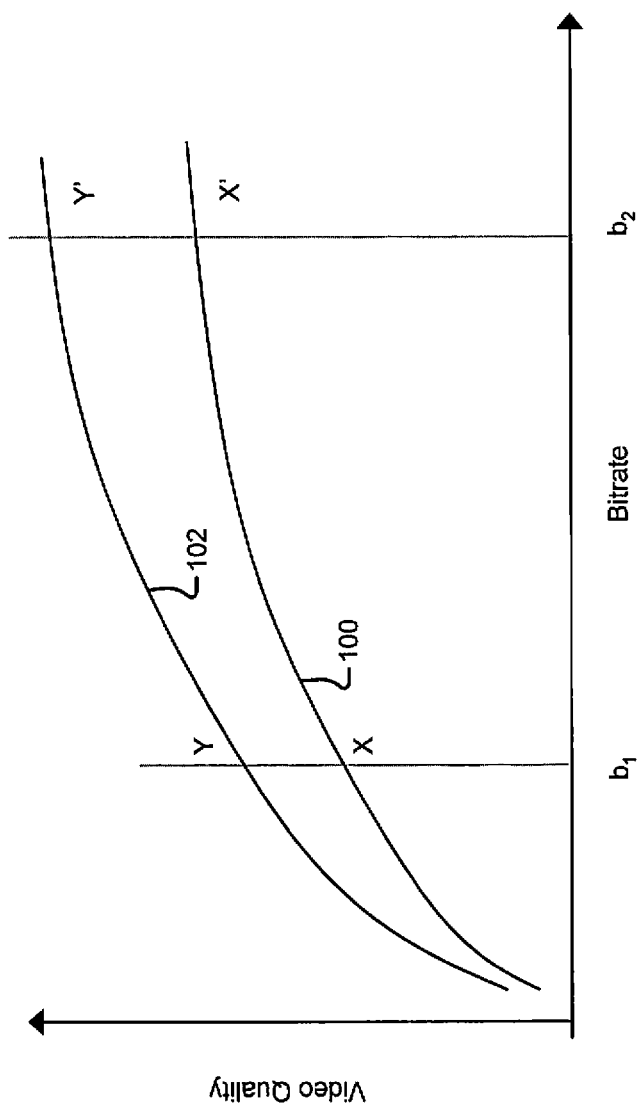
FIG. 2 is a graphical representation of video quality and bitrate for coding methods according to the present disclosure.

Referring now to FIG. 2, a graphical representation of the first coding method 100 and the fourth coding method 102 is illustrated. Codec weight for the second method versus (i.e. over) the first method at bitrate $b_1$ is Y/X and at bitrate $b_2$ is Y'/X'. Different codecs exhibit non-uniform behavior across a range of bitrates. In other words, performance gaps appear among the codecs at higher bit rates. However, at lower bitrates the codecs perform nearly the same.

For the quality factor, higher bits per pixel (i.e., bitrate/(spatial resolution×temporal resolution)) tends to lead to a higher quality factor. In one embodiment, a higher quality factor indicates that the video signal (e.g., coded video stream) is of higher quality and has less artifacts caused by signal compression than the video signal would with a lower quality factor. Codecs tend to provide a higher quality factor when allowed to represent the video content at higher bits per pixel. Codec weight indicates quality variation across codecs. Further, for the same bitrate, a first coding method provides higher quality than a less efficient second coding method.

In one embodiment, several parameters in an encoder module (not shown) of the content transmitting system 11 are set. The parameters are set when the content transmitting system 11 encodes a video content at a specific bitrate and spatial/temporal resolution using a particular codec. The content transmitting system 11 transmits to the system 10 the video signal. The video signal includes an indication of the parameters along with the video content. The parameters are different than the metadata and provide direct indications of content quality.

Examples of the parameters are average quantization parameter (QP) value, bitrate/frame rate (bits/frame), number of inter blocks, number of skipped blocks, frame rate, number of inter blocks having a first size, such as 8×8, 16×8 and 8×16, number of inter blocks having a second size, such as 4×4, 8×4 and 4×8, and average motion vector length.

For a sequence that has N of the parameters, the video quality estimation module 16 forms a weighted sum to arrive at a perceptual video quality metric (PVQM) (i.e., perceptual quality factor) of a video sequence. The weighted sum corresponds to:

$$PVQM = \beta_0 + \sum_{i=1}^{N} \beta_i x_i,$$

β corresponds to constants computed from a training set, and x corresponds to the particular parameter. A range of the perceptual quality factor is partitionable into smaller ranges. Each of the smaller ranges categorizes a subset of the video sequence, such as a group of pictures or frames. In one embodiment, the video quality estimation module 16 receives the N parameters as inputs from the decoder module 14.

The video quality estimation module 16 quantizes the perceptual quality factor into bins (not shown). The database control module 18 then accesses the video post-processor settings needed for quality factors that correspond to the bins via an index (not shown). For example, the video quality estimation module 16 quantizes the perceptual quality factor into 4-2 bits bins and implements a 2 bit index for accessing of the video post-processor settings needed for each quality factor.

Figure 3:
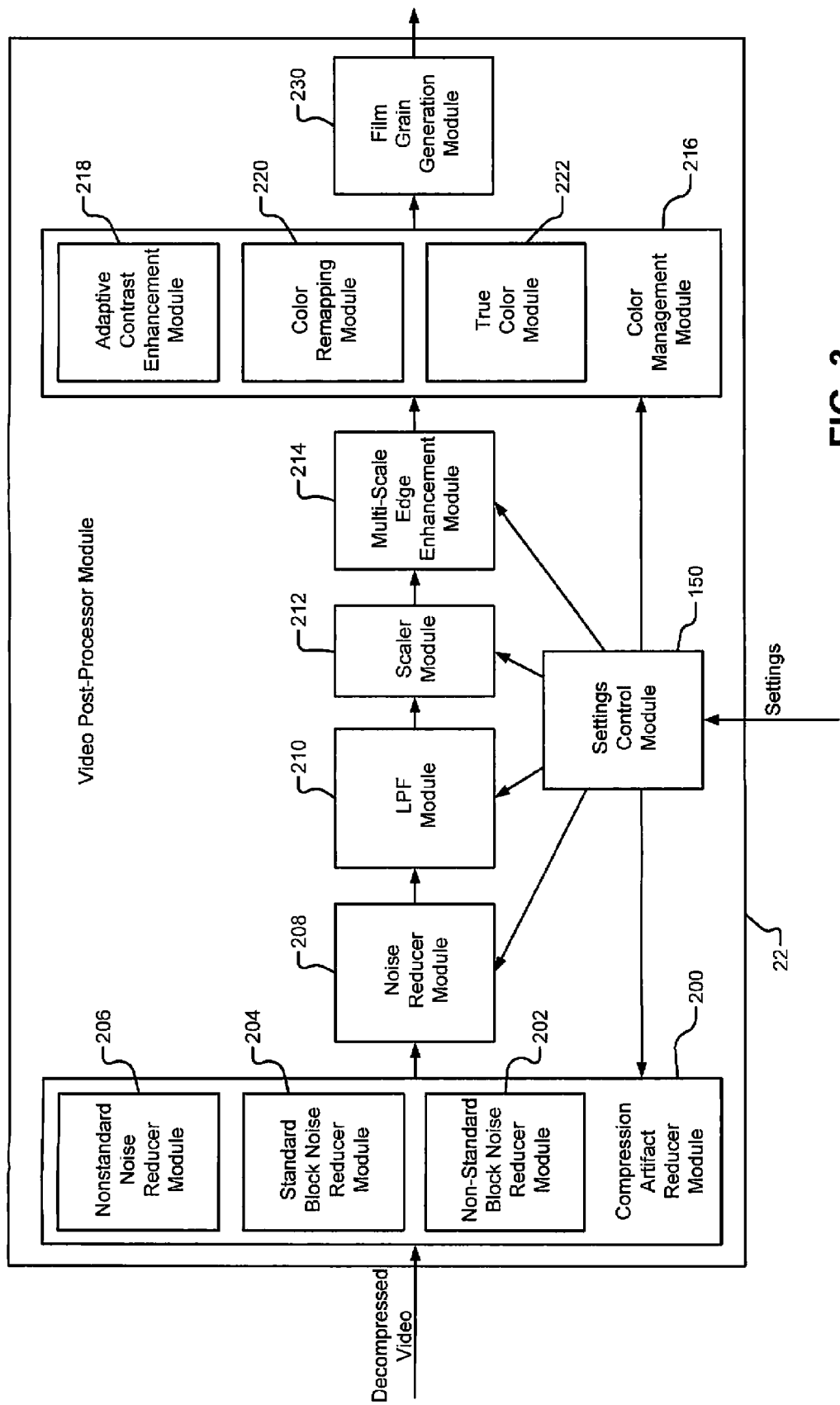
FIG. 3 is a block diagram that illustrates a video post-processor module according to the present disclosure.

Referring now to FIG. 3, the post-processor module 22 is illustrated in greater detail. The post-processor module 22 receives the decompressed video signal from the decoder module 14 and post-processor settings from the database 20. The post-processor module 22 has a plurality of modules and sub-modules that are adjusted based on the settings.

For example, each setting adjusts one or more of the modules and/or sub-modules in order to change the quality of the compressed video signal with respect to a displayed image based on the compressed video signal. In one embodiment, each of the modules and sub-modules automatically adjusts its own setting in response to database settings. In another embodiment, a setting control module 150 controls settings of the modules and/or sub-modules based on the database settings. In one embodiment, the settings control module 150 automatically controls the settings of the modules and/or sub-modules based on the database settings.

Examples of modules and sub-modules are a compression artifact reducer module 200, a nonstandard block noise reducer module 206 that may be a mosquito and ringing noise reducer module and a standard block noise reducer module 204.

For example, when the quality factor indicates that the video signal has excessive blockyness, the database control module 18 selects the blockyness setting in the database 20. In one embodiment, the blockyness setting simply turns the standard block noise reducer module 204 on/off in the post-processor module 22. In another embodiment, the blockyness setting sets the standard block noise reducer module 204 to a predetermined level. In another embodiment, the blockyness setting simply increases or decreases a value within the standard block noise reducer module 204 between a minimum and a maximum range of the standard block noise reducer module 204.

Further examples of modules and sub-modules are a non-standard block noise reducer module 206, a noise reducer module 208, a low pass filter (LPF) module 210 and a scaler module 212. Further examples of modules and sub-modules are an edge multi-scale edge enhancement module 214, a color management module 216, an adaptive contrast enhancement module 218, a color remapping module 220, a true color module 222, and a film grain generation module 230.

The compression artifact reducer module 200 reduces artifacts from the incoming decompressed video signal. The compression artifact reducer module 200 has various artifact reducing sub-modules. The sub-modules are the mosquito and ringing noise reducer module 202, the standard block noise reducer module 204 and the nonstandard block noise reducer module 206. Each of the sub-modules handles a different type of artifact, such as mosquito and ringing noise and standard and non-standard block noise, in the decompressed video signal. The nonstandard block noise reducer module 202 handles block noise reduction when the decompressed video signal is scaled.

The spatio-temporal noise reducer module 208 reduces noise, such as Gaussian noise, in the decompressed video signal. The LPF module 210, receives and adaptively filters the decompressed video signal. The scaler module 212 upscales the decompressed video signal to a predetermined output resolution. The multi-scale edge enhancement module 214 filters the decompressed video signal to improve apparent sharpness of the signal, thus enhancing edge contrast of the signal. For example, the edge enhancement module 214 enhances fine details and provides luminance/chrominance transition improvements in the decompressed video signal.

The color management module 216 manages the appearance of colors in the decompressed video signal. The color management module 216 has various sub-modules to manage the appearance of color. One embodiment of the color management module 216 has the adaptive contrast enhancement module 218, the color remapping module 220 and the true color module 222.

The adaptive contrast enhancement module 218 adjusts contrast within the decompressed video signal. The color remapping module 220 provides hue/saturation adjustments and has flesh-tone detection and correction. The true color module 222 reduces banding artifacts. Banding artifacts occur when X bit content is displayed on a high contrast display that can resolve more shades of the luminance or color signal compared to the input signal. The true color module 222 also reduces low contrast blocking artifacts. The film grain generation module 230 adds film grain-like noise to the compressed video signal in cases when there is loss of detail due to excessive compression.

In one embodiment, the settings in the database are predetermined through testing various settings for one or more of the modules of the post-processor module 22. In other words, for particular quality factors, a technician views the display 26 and adjusts settings of the post-processor module 22 to improve images on the display. The settings are then each assigned to one of a plurality of quality factors. The quality factors correspond to levels of content quality, which are characterized in one embodiment as low, moderate and high.

For example, a low quality factor, e.g., less than 0.15, indicates low bitrate content, e.g., content having a bitrate less than 500 kbps and/or spatial resolutions of 384×288 or lower.

In one embodiment, the post-processor module settings are aggressive for the low quality factor. Aggressive means that the settings are set from off to on or that the settings are set to a high range. The aggressive settings are specific to one or more of the post-processor modules, such as the compression artifact reducer module 200 and the edge enhancement module 214. The low bitrate content tends to have extensive blockyness, ringing artifacts and washed out colors. In one embodiment, settings for particular modules are selected that have the most impact on the present artifacts. For example, settings for the compression artifact reducer module 200 and the multi-scale edge enhancement module 214 are selected because they have the most impact on extensive blockyness, ringing artifacts and washed out colors.

Further, a moderate quality factor, e.g., in the range 0.15 to 0.5, indicates moderate bitrate content, e.g., content having a bitrate 500 kbps to around 1 Mbps and spatial resolutions are 480×360 (360p) and higher.

In one embodiment, the post-processor module settings are aggressive for the moderate quality factor. The aggressive settings are specific to one or more of the post-processor modules, such as the compression artifact reducer module 200 and the edge enhancement module 214. The moderate bitrate content tends to have some blockyness and ringing artifacts. The compression artifact reducer module 200 and the edge enhancement module 214 are selected in one embodiment because they have the most impact on blockyness and ringing artifacts.

Still further, a high quality factor, e.g., greater than 0.5, indicates a high bitrate content, e.g., content having greater than 1 Mbps and spatial resolutions are 480×360 (360p) and higher including 1280×720 (720p).

In one embodiment, the post-processor module settings are not aggressive for the high quality factor. These settings are specific to one or more of the post-processor modules, such as the compression artifact reducer module 200 and the edge enhancement module 214. The high bitrate content tends to have minor blockyness and ringing artifacts. The compression artifact reducer module 200 and the edge enhancement module 214 are selected in one embodiment because they have the most impact on blockyness and ringing artifacts.

In another embodiment, quality factors are characterized as simply high or low. For high quality factors, the mild settings for the post-processor module 22 are used. For moderate to low quality factors, aggressive settings are used.

One example of aggressive settings are setting the compression artifact reducer module 200 to high, setting the edge enhancement module 214 to high, setting the spatio-temporal noise reducer module 208 to off, setting the scaler module 212 to on, setting the color remapping module 220 to moderate (e.g., between high and low settings) depending on the video content, setting the true color module 222 to on/high, and setting the film grain generation module 230 to off or on depending on the video content.

One example of mild settings are setting the compression artifact reducer module 200 to mild (e.g., between high and low settings but closer to the low settings than the high settings), setting the multi-scale edge enhancement module 214 to mild, setting the color remapping module 220 the same as for the aggressive settings, setting the spatio-temporal noise reducer module 208 to off, setting the scaler module 212 to on, setting the color remapping module 220 the same as for the aggressive settings, setting the true color module 222 to on/high, setting the film grain generation module 230 to off.

Figure 4:
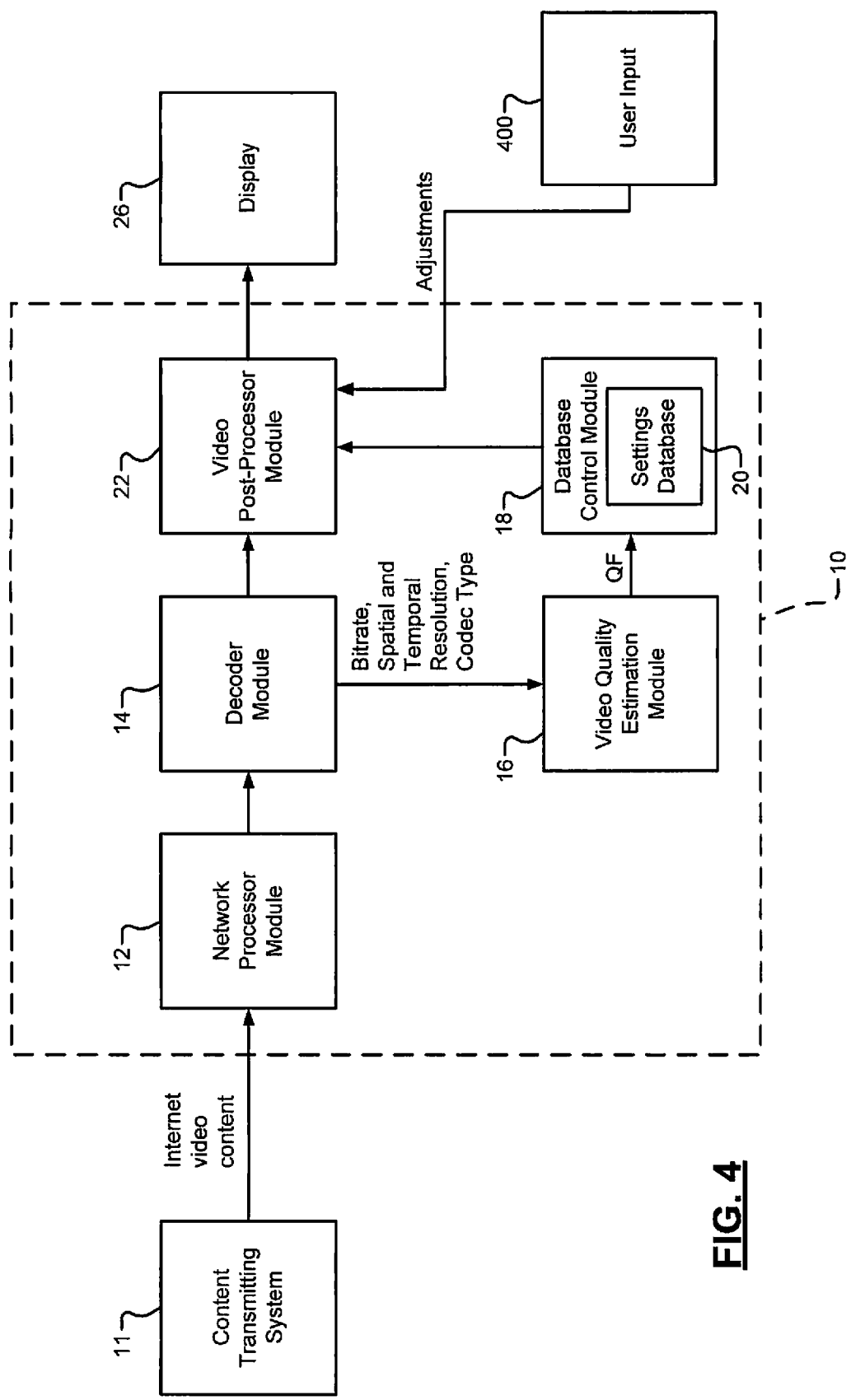
FIG. 4 is a block diagram that illustrates a video processing system according to a second embodiment of the present disclosure.

Referring now to FIG. 4, an alternative embodiment of the system 10 is illustrated. In this embodiment, a user input 400 is provided whereby a user provides settings to the post-processor module 22. The user reviews the display 26 and supplements or changes the settings of the post-processor module 22 from the database 20. The user or a group of users adjusts settings via the database control module 18 to visually pleasing result for the display of the video content.

Alternatively, the settings for the post-processor module 22 do not set all of the modules. Instead, the user input provides settings for the post-processor module 22 for the modules that were not set by the database settings. In one embodiment, user input 400 sets modules that do not have corresponding metadata available in the video content signal, for example, the non-standard block noise reducer module 202 and the film grain generation module 230.

Figure 5A:
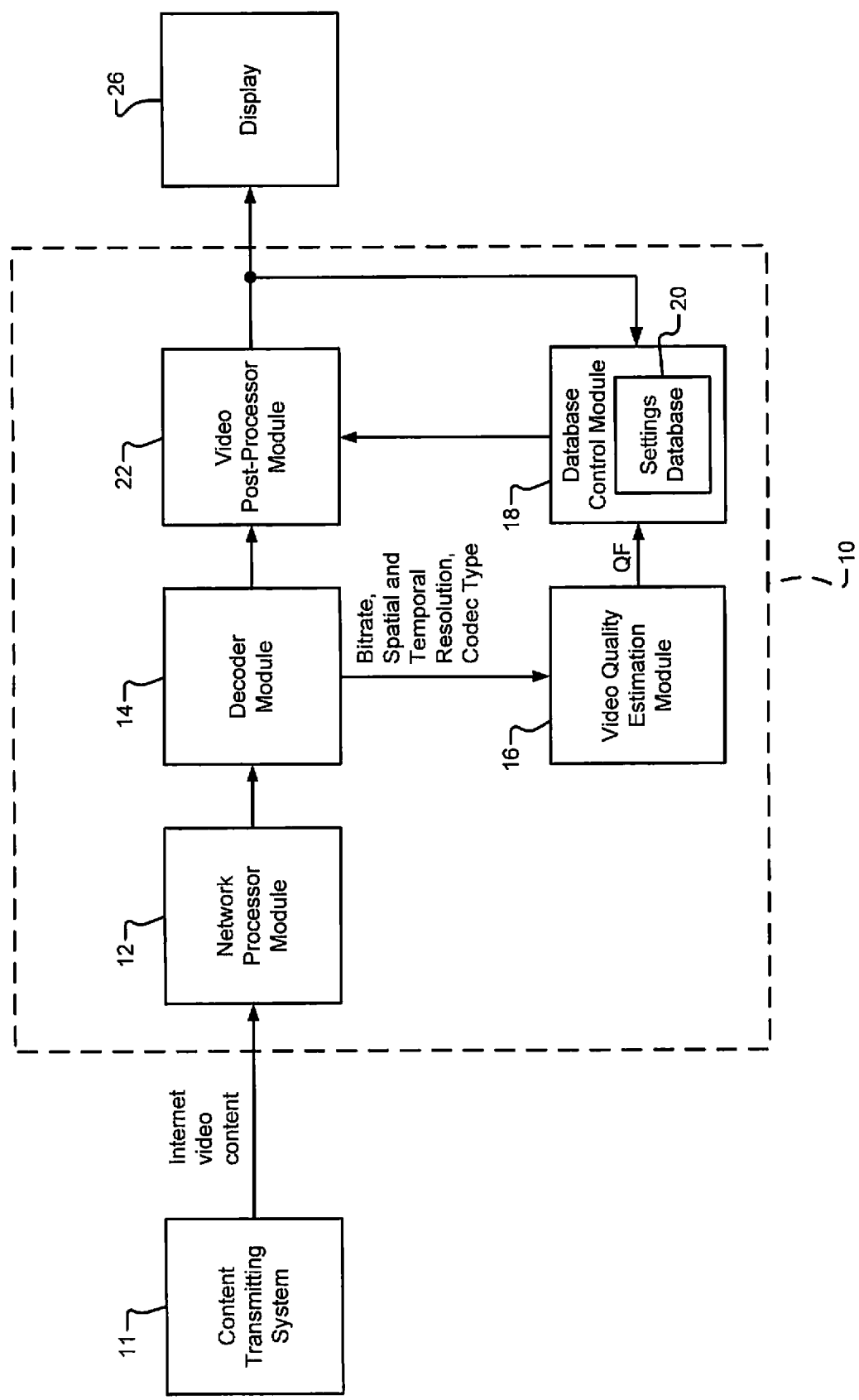
FIG. 5A is a block diagram that illustrates a video processing system according to a third embodiment of the present disclosure.

Referring now to FIG. 5A, an alternative embodiment of the system 10 is illustrated. In this embodiment, the database control module 18 receives outputs of the post-processor module 22 after the settings have been adjusted based on the quality factor.

In other words, FIG. 5A illustrates a closed loop scheme where a quality factor is used to initially select the settings of the post-processor module 22. The input and output signals of the post-processor module 22 are monitored to estimate residual artifacts in the output video after the initial settings are implemented. Examples of residual artifacts are blockyness and blurriness. Setting selection is further refined prior to processing of a subsequent sequence, group of pictures or frame based on adjustments to the settings. The adjustments to the settings are made in response to the residual artifacts in the output video.

The system of FIG. 5A therefore provides an automated adjustment mechanism for the settings of the post-processor module 22. For example, the settings may be adjusted from mild to aggressive based on the amount of residual artifacts in outputs of the video post-processor module 22.

Figure 5B:
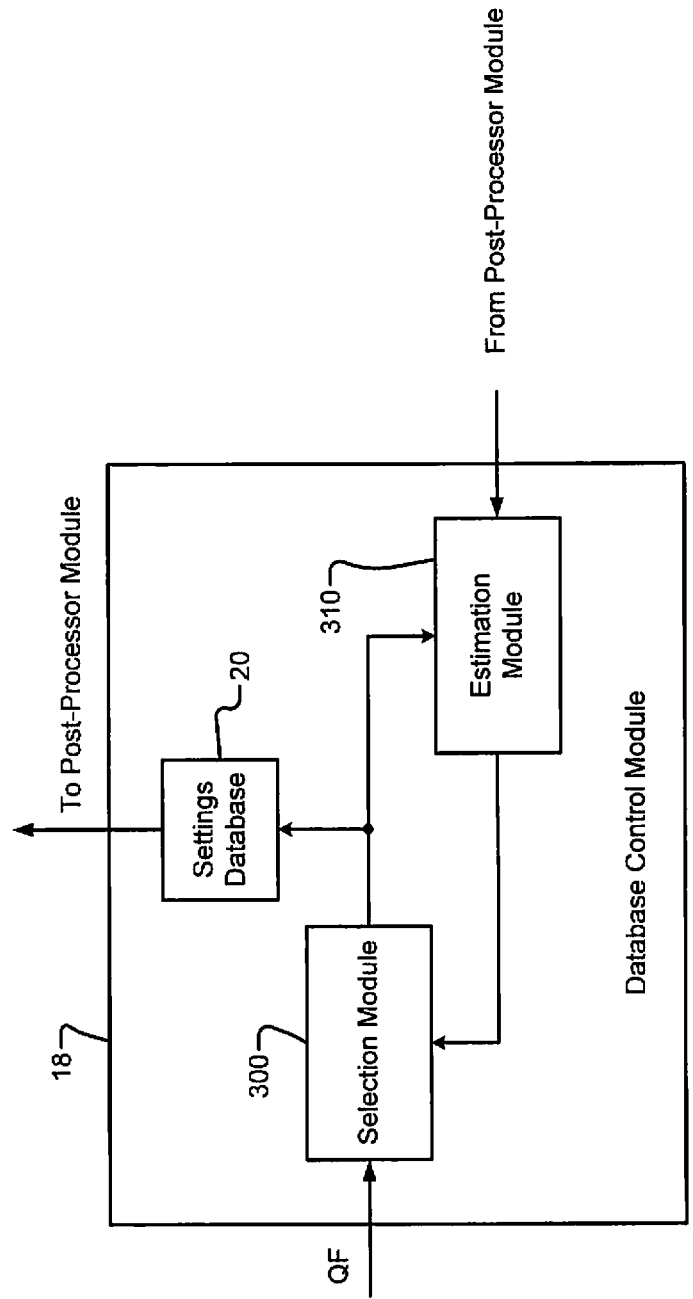
FIG. 5B is a block diagram that illustrates a database control module according to the third embodiment of the present disclosure.

Referring now to FIG. 5B, the database control module 18 is illustrated. The database control module 18 has a selection module 300 that receives quality factors from the video quality estimation module 16. The selection module 300 selects settings from the database 20. An estimation module 310 estimates residual artifacts in output signals from the video post-processor module 22. The selection module 300 receives estimates from the estimation module 310 and adjusts selection of settings based on both the estimates and the quality factors. The selection module 300 then selects settings from the database 20 based on the adjusted selection of settings.

Figure 6:
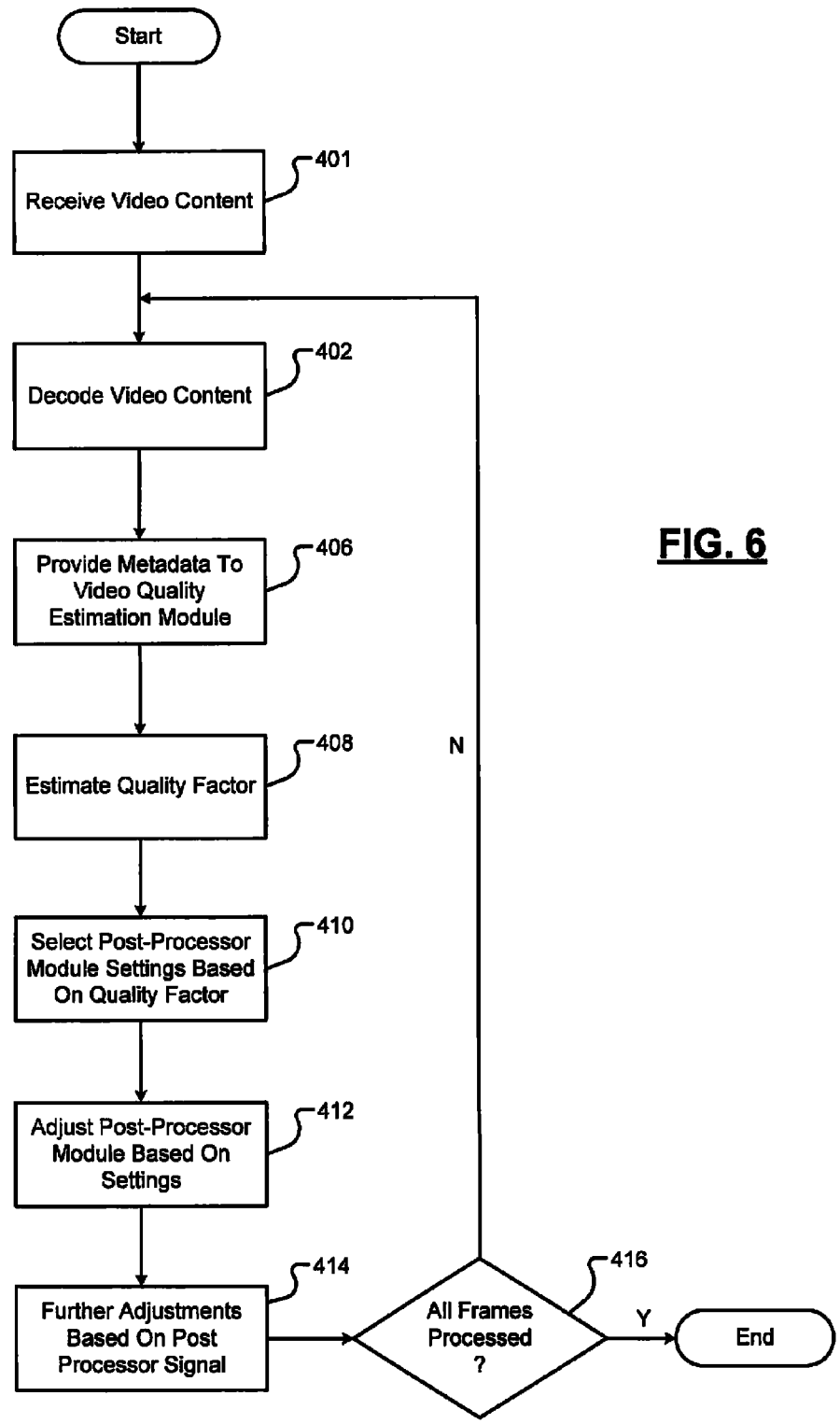
FIG. 6 is a block diagram that illustrates a method for operating a video processing system according to the present disclosure.

Referring now to FIG. 6, an example of operations used for adjusting settings of the post-processor module 22 is illustrated. At 401, the network processor module 12 receives video content along with data that describes transmission features for the video content, such as metadata. At 402, the decoder module 14 decodes the video content. At 406, the decoder module 14 provides the metadata to the video quality estimation module 16. At 408, the video quality estimation module 16 estimates a quality factor based on the metadata.

At 410, the database control module 18 selects settings for the post-processor module 22 based on the quality factor. At 412, the post-processor module 22 adjusts settings based on the quality factor. At 414, further adjustments may be made based on outputs from the post-processor module 22. User inputs and/or the database control module 18 may provide further adjustments. At 416, if all frames of the video content are not processed, control returns to 402.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system, comprising:
   a quality estimation module configured to estimate a visual quality of video content based on data from a decoder module;
   a settings database configured to i) store a plurality of predetermined settings, wherein the plurality of predetermined settings correspond to adjustable settings for video post-processing, ii) select, based on the visual quality, at least one of the predetermined settings stored in the settings database, and iii) output the at least one of the predetermined settings; and
   a video post-processor module configured to automatically adjust settings of the video post-processor module based on the at least one of the predetermined settings, wherein the video content is processed based on the settings of the video post-processor module that were automatically adjusted,
   wherein the quality estimation module determines a quality factor to represent the visual quality of the video content,
   wherein the data includes metadata information that indicates transmission features for the video content,
   wherein the metadata information includes a bitrate of the video content, a spatial resolution of the video content, a temporal resolution of the video content and a codec type of the video content,
   wherein the quality estimation module estimates the quality factor based on the bitrate and a codec weight divided by the spatial resolution and the temporal resolution, and
   wherein the codec type is weighted relative to other codec types, and wherein the codec weight is an assigned weight for the codec type relative to the other codec types.

2. The system of claim 1, wherein the metadata information is transmitted along with the video content from a transmission source external to the system.

3. The system of claim 1,
   further comprising a database control module to select the at least one of the predetermined settings based on the quality factor,
   wherein the database control module comprises an estimation module to adjust selection of the at least one of the predetermined settings based on video outputs of the video post-processor module.

4. The system of claim 1,
   wherein the metadata information comprises a plurality of parameters for the video content, and
   wherein the quality estimation module determines the quality factor by generating a weighted sum of the plurality of parameters.

5. The system of claim 1,
   wherein the decoder module sections the video content into one of flows of the video content, groups of pictures of the video content and frames of the video content, and
   wherein the quality estimation module estimates the visual quality for each of the one of the flows of the video content, the groups of pictures of the video content and the frames of the video content.

6. The system of claim 1,
   wherein the post-processor module has a plurality of sub-modules to be adjusted based on the at least one of the predetermined settings, and
   wherein one of the sub-modules adjusts at least one of blockyness, ringing, mosquito noise, false edges, blurring and loss of colorfulness in the video content.

7. The system of claim 6, wherein the post-processor module automatically adjusts sub-module settings of at least one of the plurality of sub-modules based on the at least one of the predetermined settings.

8. A system, comprising:
   a quality estimation module configured to estimate a visual quality of video content based on data from a decoder module;
   a settings database configured to i) store a plurality of predetermined settings, wherein the plurality of predetermined settings correspond to adjustable settings for video post-processing, ii) select, based on the visual quality, at least one of the predetermined settings stored in the settings database, and iii) output the at least one of the predetermined settings;
   a video post-processor module configured to automatically adjust settings of the video post-processor module based on the at least one of the predetermined settings, wherein the video content is processed based on the settings of the video post-processor module that were automatically adjusted,
      wherein the post-processor module has a plurality of sub-modules to be adjusted based on the at least one of the predetermined settings,
      wherein one of the sub-modules adjusts at least one of blockyness, ringing, mosquito noise, false edges, blurring and loss of colorfulness in the video content, and
      wherein the post-processor module automatically adjusts sub-module settings of at least one of the plurality of sub-modules based on the at least one of the predetermined settings; and
   an estimation module to estimate residual artifacts in output signals from the post-processor module,
   wherein the output signals include the video content after the sub-module settings have been adjusted a first time, and
   wherein the selection module re-selects from at least one of the predetermined settings based on estimates of the residual artifacts to adjust the sub-module settings a second time.

9. A method, comprising:
   estimating a visual quality of video content based on data from a decoder module;
   storing, in a settings database, a plurality of predetermined settings, wherein the plurality of predetermined settings correspond to adjustable settings for video post-processing;
   selecting, based on the visual quality, at least one of the predetermined settings stored in the settings database;
   outputting the at least one of the predetermined settings;

automatically adjusting settings of a video post-processor module based on the at least one of the predetermined settings, wherein the video content is processed based on the settings of the video post-processor module that were automatically adjusted;

determining a quality factor to represent the visual quality of the video content, wherein the data includes metadata information that indicates transmission features for the video content, wherein the metadata information includes a bitrate of the video content, a spatial resolution of the video content, a temporal resolution of the video content and a codec type of the video content;

estimating the quality factor based on the bitrate and a codec weight divided by the spatial resolution and the temporal resolution;

weighting the codec type relative to other codec types; and assigning the codec weight a weight for the codec type relative to the other codec types.

10. The method of claim 9, further comprising:
transmitting the metadata information along with the video content from a transmission source external to a system that implements the method.

11. The method of claim 9, further comprising:
selecting the at least one of the predetermined settings based on the quality factor; and
adjusting selection of the at least one of the predetermined settings based on video outputs of the video post-processor module.

12. The method of claim 9, further comprising:
determining the quality factor by generating a weighted sum of a plurality of parameters for the video content, wherein the metadata information comprises the plurality of parameters for the video content.

13. The method of claim 9, further comprising:
sectioning the video content into one of flows of the video content, groups of pictures of the video content and frames of the video content; and
estimating the visual quality for each of the one of the flows of the video content, the groups of pictures of the video content and the frames of the video content.

14. The method of claim 9, further comprising:
estimating residual artifacts in output signals from the post-processor module, wherein the output signals include the video content after sub-module settings for sub-modules of the video post-processor module have been adjusted a first time; and
re-selecting from at least one of the predetermined settings based on estimates of the residual artifacts to adjust the sub-module settings a second time.

* * * * *